United States Patent
Muraji

(10) Patent No.: US 6,472,967 B1
(45) Date of Patent: Oct. 29, 2002

(54) ACTUATOR USING A MAGNETIC CIRCUIT TO PRODUCE A COUNTERFORCE

(75) Inventor: Tetsuo Muraji, Odawara (JP)

(73) Assignee: Mikuni Corporation, Tokyo (JP)

( * ) Notice: Subject to any disclaimer, the term of this patent is extended or adjusted under 35 U.S.C. 154(b) by 750 days.

(21) Appl. No.: 08/954,760

(22) Filed: Oct. 20, 1997

Related U.S. Application Data

(63) Continuation of application No. 08/602,383, filed on Feb. 16, 1996, now abandoned.

(30) Foreign Application Priority Data

Feb. 21, 1995 (JP) ................................................. 7-056686

(51) Int. Cl.$^7$ ............................... H01F 7/00; H01F 7/08
(52) U.S. Cl. ..................................... 335/229; 335/272
(58) Field of Search ................................. 335/229–234, 335/272; 310/36, 37, 49 R, 162, 164, 191, 216

(56) References Cited

U.S. PATENT DOCUMENTS

| | | | |
|---|---|---|---|
| 4,103,191 A | | 7/1978 | Kawamura et al. ............ 310/49 |
| 4,141,210 A | * | 2/1979 | Flaig ........................... 58/23 D |
| 4,542,329 A | | 9/1985 | Tu Xuan ...................... 318/696 |
| 4,992,685 A | * | 2/1991 | Boon et al. .................... 310/37 |
| 5,334,893 A | | 8/1994 | Oudet et al. ................... 310/38 |

* cited by examiner

Primary Examiner—Ramon M. Barrera
(74) Attorney, Agent, or Firm—Varndell & Varndell, PLLC

(57) ABSTRACT

An actuator for rotating (or moving) a rotor (or a moving member) according to the current flowing through an electromagnetic coil. Magnetic energy of magnetomotive force induced in the electromagnetic coil when energized is stored in an air gap and a sub-air gap provided in a magnetic path. The rotor (or the moving member) comes to rest at a position where the stored magnetic energy becomes the smallest. The stored magnetic energy serves as a source of counterforce and functions in the same way as a spring.

3 Claims, 5 Drawing Sheets

ACTUATOR USING A MAGNETIC CIRCUIT TO PRODUCE A COUNTERFORCE

This application is a continuation of Ser. No. 08/602,383 filed Feb. 16, 1996, now abandoned.

BACKGROUND OF THE INVENTION

1. Field of the Invention

The present invention relates to an actuator capable of reliably stopping a moving member, e.g. a rotor, at a predetermined position according to the coil current without a need of a mechanical element for producing counterforce, such as a spring.

2. Description of the Prior Art

In general, a rotary solenoid is used to control the position of a moving member, e.g. a rotor, according to the coil current. This type of rotary solenoid has a basic arrangement in which a rotor which is formed from a permanent magnet is disposed between a pair of opposing magnetic pole pieces, and the rotor is rotated by using magnetic flux from a magnetic source produced according to the operating current.

In this case, in order to control the rotor to a desired position, a spring which is adapted to produce a counterforce proportional to the rotor position is used in combination, and a stop position of the rotor is determined by the balance of the torque induced according to the coil current and the counterforce of the spring.

The above-described conventional apparatus needs a mechanical element, e.g. a spring, and consequently involves problems in terms of reliability, e.g. vibration and wear of the operating part.

SUMMARY OF THE INVENTION

In view of the above-described problems of the prior art, an object of the present invention is to provide an actuator improved in reliability by eliminating the need of using a mechanical element such as a spring.

DETAILED DESCRIPTION OF THE EMBODIMENTS

Embodiments of the present invention will be described below with reference to the accompanying drawings.

Figure 1:
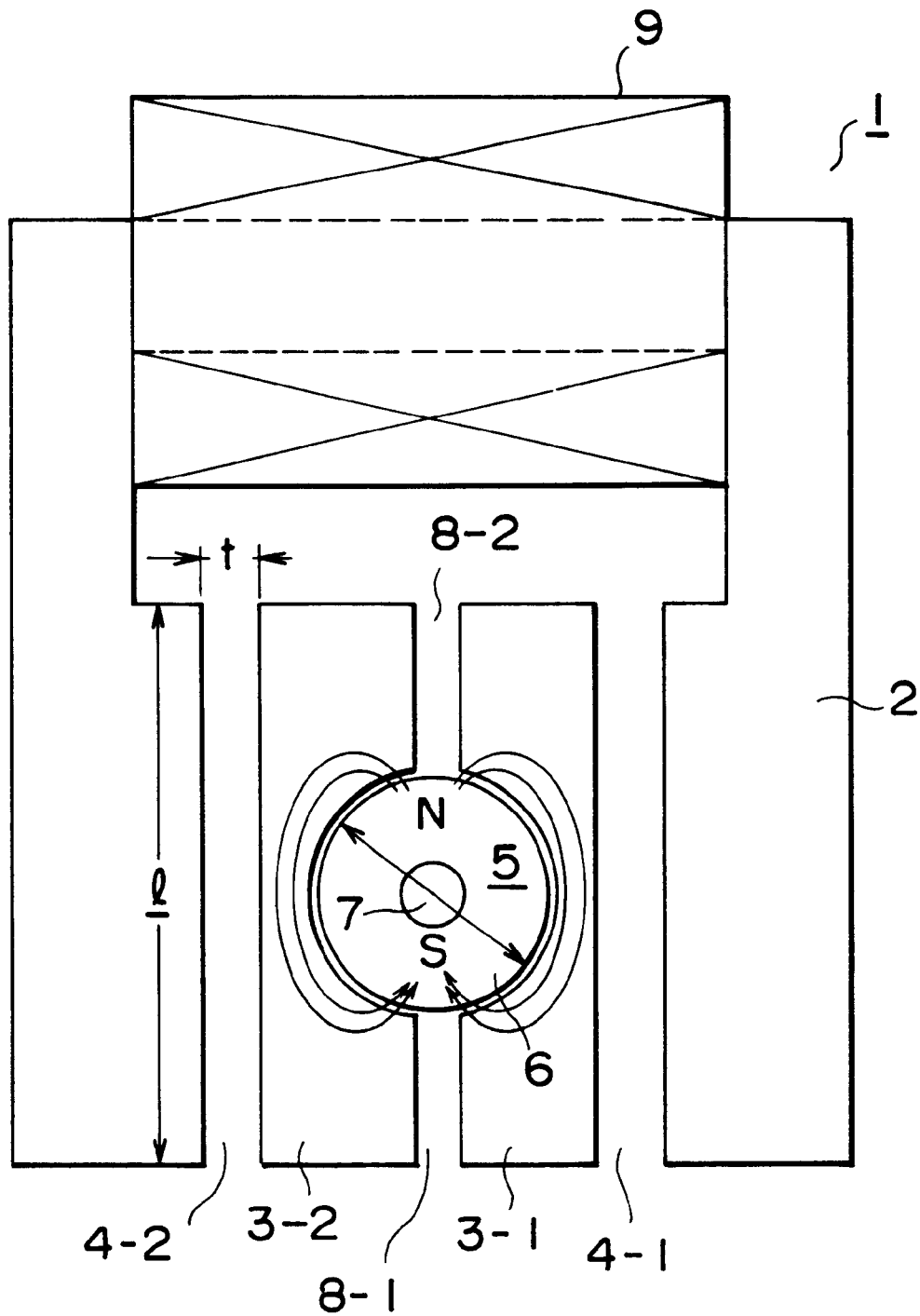
FIG. 1 shows the arrangement of one embodiment of the actuator according to the present invention.

FIG. 1 shows the arrangement of one embodiment of the actuator according to the present invention. In FIG. 1, an actuator body 1 has a U-shaped magnetic path or element 2, and a pair of magnetic pole pieces 3-1 and 3-2 which are disposed at both ends, respectively, of the magnetic path or element 2. It should be noted that an air gap 4-1 is provided between the pole piece 3-1 and the magnetic path 2, and another air gap 4-2 between the pole piece 3-2 and the magnetic path or element 2. The air gaps 4-1 and 4-2 function as magnetic reluctance portions.

A main air gap 5 is provided between the pole pieces 3-1 and 3-2. Sub-air gaps 8-1 and 8-2 are provided at both sides, respectively, of the main air gap 5. A rotor 6 which is formed from a permanent magnet is disposed in the main air gap 5. The rotor 6 is adapted to rotate through a shaft 7. Reference numeral 9 denotes an electromagnetic coil (magnetic source).

The operation of this embodiment will be explained below.

When the electromagnetic coil 9 is not energized, no magnetic flux passes through the magnetic path or element 2. Accordingly, magnetic flux from the north pole of the rotor 6 flows to the south pole of the rotor 6 through the pole pieces 3-1 and 3-2 as shown by the solid lines in the figure.

In this case, all the magnetic flux flows via the main air gap 5. Therefore, there is no magnetic flux in either of the sub-air gaps 8-1 and 8-2, which lie at both sides (upper and lower sides as viewed in FIG. 1) of the rotor 6. That is, this state is the most stable in terms of magnetism, and the rotor 6 is at rest in this position (position shown in the figure).

Next, when the electromagnetic coil 9 is energized, magnetic flux from the magnetic source 9 passes through a path comprising the magnetic path or element 2, the magnetic reluctance 4-1, the sub-air gap 8-1 or 8-2, the pole piece 3-2, the magnetic reluctance 4-2 and the magnetic path or element 2. Accordingly, magnetomotive force thus produced is stored as magnetic energy in the air gaps 4-1 and 4-2 and the sub-air gaps 8-1 and 8-2, which function as magnetic reluctances in the magnetic path. Therefore, the rotor 6 rotates and comes to rest at a position where the stored magnetic energy becomes the smallest.

At this time, energy produced by the rotation of the rotor 6, which is formed from a permanent magnet, is also stored in the air gaps (third gaps) 4-1, 4-2, 8-1 and 8-2. Thus, according to this embodiment, the magnetic energy stored in the air gaps functions as a spring which has been used in the conventional rotary solenoid to store mechanical energy in order to determine a stop position. It should be noted that the amount of stored energy can be determined by the air gap width t and the cross-sectional area 1 of the magnetic path.

Figure 2:
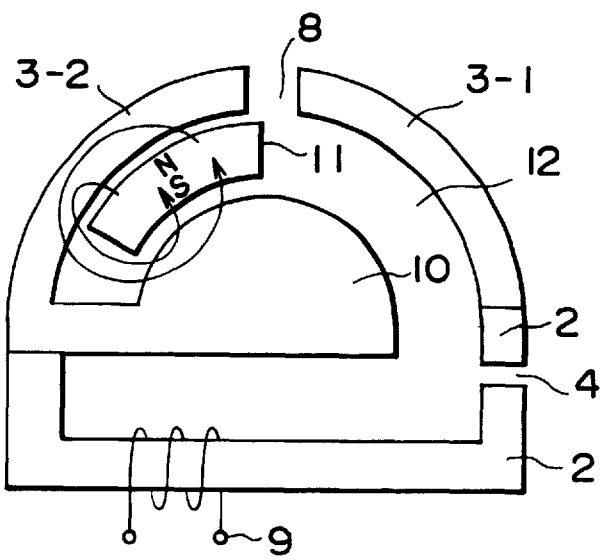
FIG. 2 shows the arrangement of another embodiment of the actuator according to the present invention.

FIG. 2 shows the arrangement of another embodiment of the actuator according to the present invention. In FIG. 2, portions or members having the same functions as those in FIG. 1 are denoted by the same reference numerals. In this embodiment, pole pieces 3-1 and 3-2 are formed in the shape of a circular segment, and a single sub-air gap 8 is provided in an intermediate portion of the circular segment. In addition, a projecting piece 10 is provided in a space surrounded by the pole pieces 3-1 and 3-2. The projecting piece 10 has a configuration which is conformable to the curvature of the circular segment comprising the pole pieces 3-1 and 3-2.

A moving member 11 which is formed from a permanent magnet is moved in a space 12 (main air gap) which is formed between the circular pole pieces 3-1 and 3-2 and the projecting piece 10. Needless to say, the moving member 11 moves together with a driving member (not shown).

The operation of the second embodiment will be explained below.

FIG. 2 shows the actuator in a state where no current is flowing through the electromagnetic coil 9. In this case, magnetic flux from the moving member 11 flows as shown in the figure. There is no magnetic flux flowing through the sub-air gap 8. This is a stable state, and the moving member 11 is at rest in this position (position shown in the figure).

Figure 3:
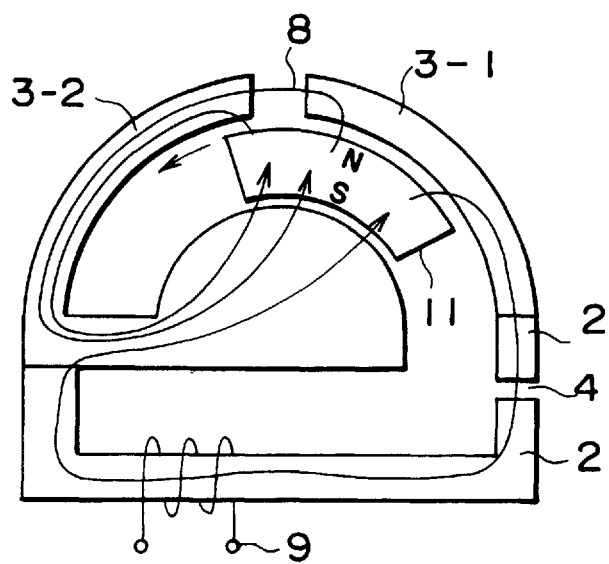
FIG. 3 illustrates an operation of the embodiment shown in FIG. 2.

FIG. 3 illustrates the way in which counterforce acts on the moving member 11. Let us consider a case where the moving member 11 has been moved to the position illustrated in FIG. 3 with no current passed through the electromagnetic coil 9. In this case, one magnetic flux from the moving member 11 returns to the south pole through the sub-air gap 8, and another magnetic flux returns to the south pole through the magnetic reluctance 4, the magnetic path 2 and the projecting piece 10, as shown in the figure. In this case, magnetic energy is stored in the sub-air gap 8 by the magnetic flux passing through the sub-air gap 8. Accordingly, a torque induced in the moving member 11 acts in a direction in which the magnetic energy in the sub-air gap 8 decreases, that is, in the direction of the solid-line arrow. The torque induced in this case has a function equivalent to that of a spring.

Figure 4:
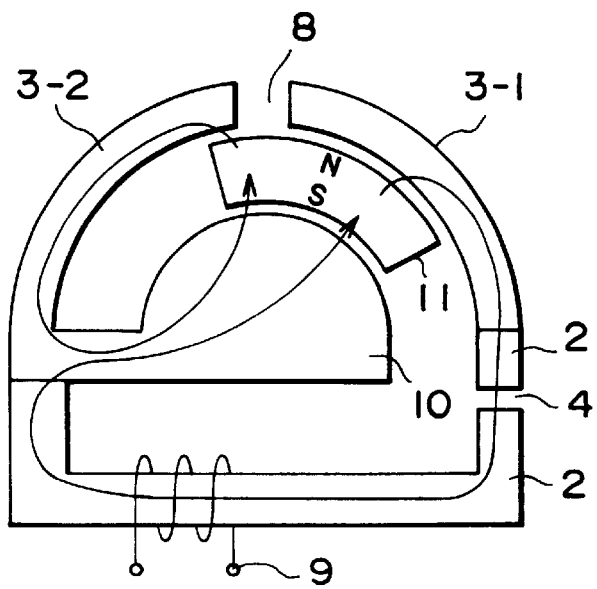
FIG. 4 illustrates an operation of the embodiment shown in FIG. 2.

FIG. 4 illustrates the operation of the actuator in a case where a predetermined current is passed through the electromagnetic coil 9. When a predetermined current is supplied to the electromagnetic coil 9, the magnetic flux that flows through the sub-air gap 8 when no current is passed through the electromagnetic coil 9 flows through the air gap 4, which functions as a magnetic reluctance. As a result, the magnetic energy in the sub-air gap 8 becomes zero, and thus a stable state is established. According to this embodiment, it is possible to set a wide movable range for the moving member 11 because the moving member 11 moves along a semi-circular path, although it is rather difficult to form the driving shaft into an appropriate configuration from the manufacturing point of view.

Figure 5:
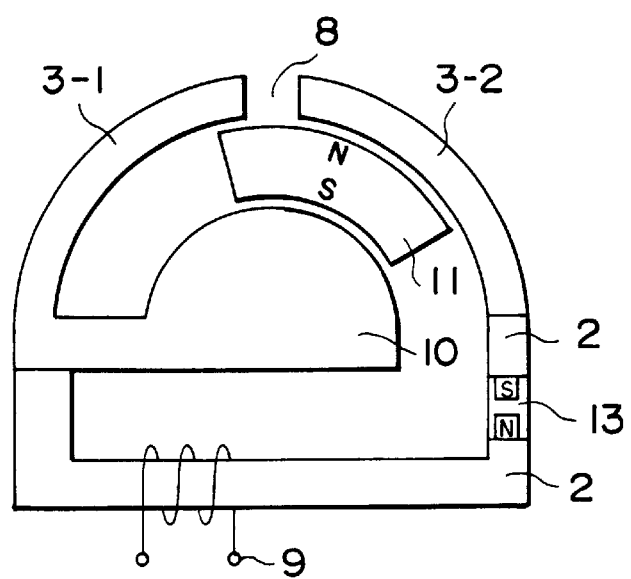
FIG. 5 shows a modification of the embodiment shown in FIG. 2.
Figure 6:
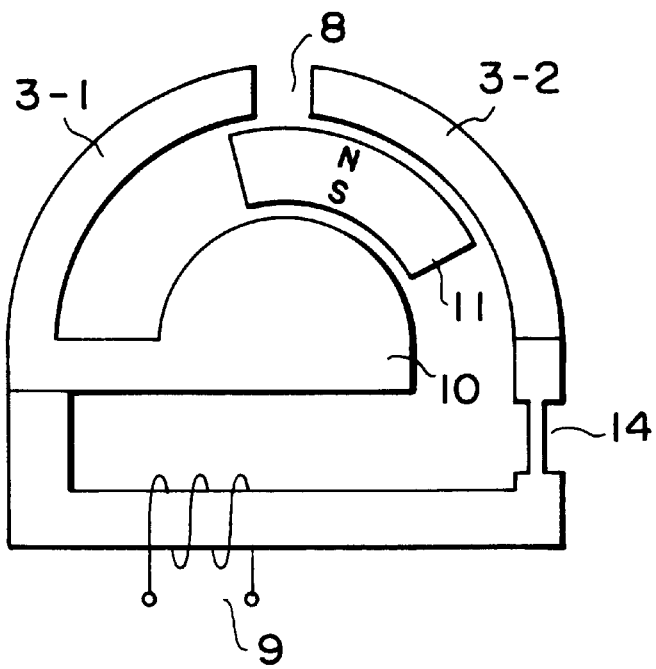
FIG. 6 shows another modification of the embodiment shown in FIG. 2.

FIG. 5 shows a modification of the second embodiment, in which the air gap 4 in the second embodiment is replaced by a permanent magnet 13. The permanent magnet 13 is inserted between the magnetic element portions with its polarity set as shown in the figure. FIG. 6 shows another modification in which the air gap 4 in the second embodiment is replaced by a magnetic path 14 which is formed by narrowing a portion of the magnetic element 2, thereby practically increasing the magnetic reluctance. According to the modification shown in FIG. 5, it is possible to set a balanced position of the moving member 11 when the electromagnetic coil 9 is not energized. The permanent magnet 13 per se also serves as a magnetic reluctance. The modification shown in FIG. 6 makes it possible to produce a connected magnetic path as an integrated structure.

Figure 7:
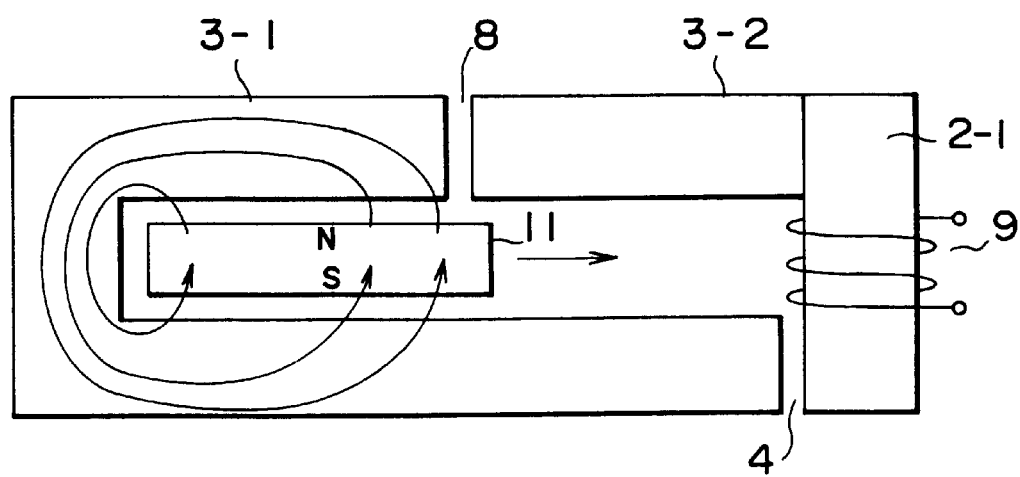
FIG. 7 shows the arrangement of still another embodiment of the actuator according to the present invention.

FIG. 7 shows the arrangement of still another embodiment of the actuator according to the present invention. In FIG. 7, portions or members having the same functions as those shown in FIG. 1 are denoted by the same reference numerals. In this embodiment, the actuator is arranged in the form of a direct-acting device as a whole. Accordingly, a single sub-air gap or sub gap 8 is provided between a pair of pole pieces 3-1 and 3-2, and a first air gap or first gap 4 that serves as a magnetic reluctance portion is interposed between a magnetic element 2-1, which is provided with an electromagnetic coil 9, and the pole piece 3-1.

The operation of the third embodiment will be explained below.

When no current is flowing through the electromagnetic coil 9, a magnetic path is formed to extend from the north pole of the moving member 11 to the south pole through the pole piece 3-1, as shown in the figure. In this case, no magnetic flux flows through the sub-air gap 8. Thus, the actuator is in a stable state in the same way as in the case of FIG. 1. Accordingly, the moving member 11 is at rest in this position (position shown in the figure).

To cause the moving member 11 to move in the direction of the arrow, an electric current is passed through the electromagnetic coil 9. Consequently, the moving member 11 moves and comes to rest at a predetermined position. The movement of the moving member 11 will be explained below with reference to FIG. 8. Let us consider a case where the moving member 11 has been moved to the illustrated position by external force with no current passed through the electromagnetic coil 9.

In this state, magnetic flux passes through the pole piece 3-2 and via the sub-air gap 8 and the air gap 4, as shown by the solid lines in the figure. At this time, energy stored in the sub-air gap 8 acts as counterforce in a direction in which the energy is reduced, i.e. as force that causes the moving member 11 to return to the left. That is, this counterforce acts as a spring.

Figure 9:
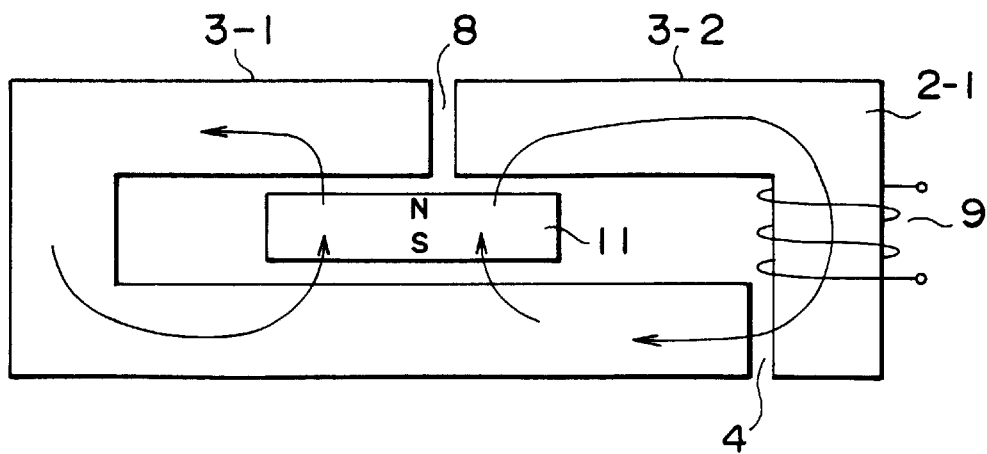
FIG. 9 illustrates an operation of the embodiment shown in FIG. 7.

When a predetermined current is passed through the electromagnetic coil 9, as shown in FIG. 9, no magnetic flux passes through the sub-air gap 8, but all the magnetic flux flows through the air gap 4. As a result, magnetic energy in the sub-air gap 8 becomes zero, and thus a stable state is established.

Figure 8:
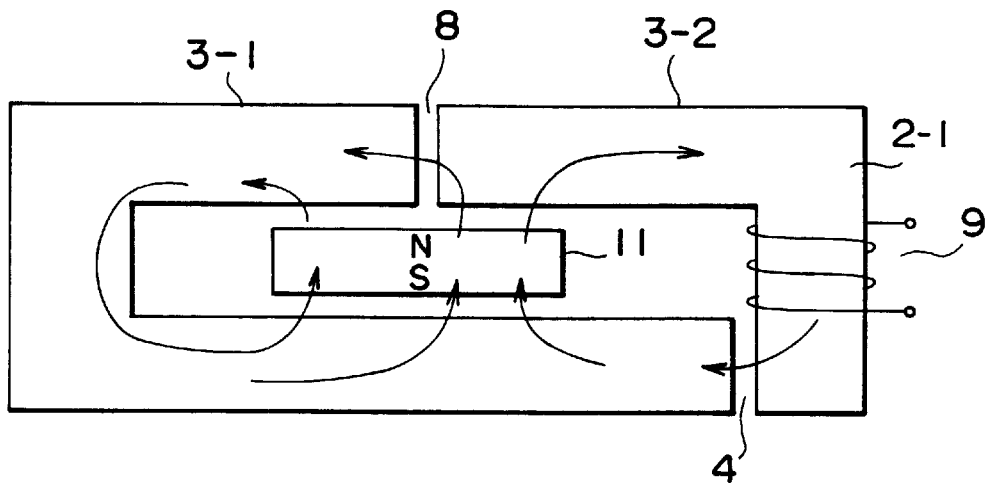
FIG. 8 illustrates an operation of the embodiment shown in FIG. 7.

In the foregoing, how counterforce is induced and it functions as a spring has been described with reference to FIGS. 7, 8 and 9. It should, however, be noted that the electromagnetic coil 9 must be energized to move the moving member 11, as a matter of course.

As has been described above, the present invention makes it possible to eliminate the need for a mechanical element such as a spring simply by providing an air gap in a magnetic circuit and to provide a reliable actuator.

What is claimed is:

1. An actuator comprising:

a pair of magnetic pole pieces facing each other across two sub-gaps, said magnetic pole pieces forming a main gap, and said main gap being arranged between said two sub-gaps;

a magnetic element for magnetically connecting together said magnetic pole pieces having at least one portion facing one of said pair of magnetic pole pieces across a third gap, said magnetic pole pieces being magnetically connected through said at least one portion to said magnetic element for magnetically connecting together said magnetic pole pieces;

a magnetic source arranged proximate to said magnetic element; and a moving member formed from a permanent magnetic, said moving member disposed in said main gap and movable relative to said magnetic element together with a driving shaft as one unit.

2. The actuator of claim 1, wherein said moving member rests in a first position when said magnetic source is not energized and said moving member rests in a second position when said magnetic source is energized.

3. An actuator comprising:

a pair of magnetic pole pieces facing each other across two sub-gaps, said magnetic pole pieces forming a main gap, and said main gap being arranged between said two sub-gaps;

a magnetic element for magnetically connecting together said magnetic pole pieces, said magnetic element separated from said magnetic pole pieces by a third gap and said magnetic element having at least one portion facing one of said pair of magnetic pole pieces across said third gap, said magnetic pole pieces being magnetically connected through said at least one portion to said magnetic element for magnetically connecting together said magnetic pole pieces;

a magnetic source arranged proximate to said magnetic element; and a moving member formed from a permanent magnet, said moving member disposed in said main gap and movable relative to said magnetic element together with a driving shaft as one unit.

* * * * *